(12) United States Patent
Van den Brink et al.

(10) Patent No.: US 7,527,169 B2
(45) Date of Patent: May 5, 2009

(54) GRIPPER DEVICE

(75) Inventors: Henry Van den Brink, Kootwijkerbroek (NL); Gerrit Doppenberg, Putten (NL)

(73) Assignee: FPS Food Processing Systems B.V. (NL)

( * ) Notice: Subject to any disclaimer, the term of this patent is extended or adjusted under 35 U.S.C. 154(b) by 888 days.

(21) Appl. No.: 10/902,253

(22) Filed: Jul. 30, 2004

(65) Prior Publication Data
US 2005/0145643 A1  Jul. 7, 2005

(30) Foreign Application Priority Data
Jul. 31, 2003  (EP)  ................................ 03077407

(51) Int. Cl.
*G07F 11/16*  (2006.01)
(52) U.S. Cl. ...................... 221/219; 221/220
(58) Field of Classification Search .................. 221/219, 221/220
See application file for complete search history.

(56) References Cited
U.S. PATENT DOCUMENTS
2,488,826 A  11/1949  Peebles 6,452,118 B1 *  9/2002  van Pinxteren et al.  ..... 177/145

FOREIGN PATENT DOCUMENTS
EP  721889 A1 *  7/1996
EP  1 285 870  2/2003

* cited by examiner

*Primary Examiner*—Patrick Mackey
*Assistant Examiner*—Michael E. Butler
(74) *Attorney, Agent, or Firm*—Stites & Harbison PLLC; Marvin Petry; Stephen J. Weyer

(57) ABSTRACT

A gripper device for displacing at least one single unit of consumer packages comprising gripper blades movable in rotating and translating manner with control members accommodated in housing, gripper members engage units on two opposite longitudinal sides after closure for picking up, transfer and placement in outer packages. Clamping members for keeping the cover closed during pickup, transfer and discharge of closed units are placed between units to keep units in relative positions during pickup, transfer and placement, cooperating with gripper and clamping members. Holder members comprise intermediate plates suspended vertically through slots in housing bottom plate and are clamped between the units. Intermediate plates are pressed vertically by a spring member, wherein a suspended main portion and the intermediate plates merge into an engaging edge having an angle under 40.degrees between main portion and engaging edge, the engaging edge, ends at the bottom portion of such a unit.

7 Claims, 1 Drawing Sheet

GRIPPER DEVICE

Figure 1:
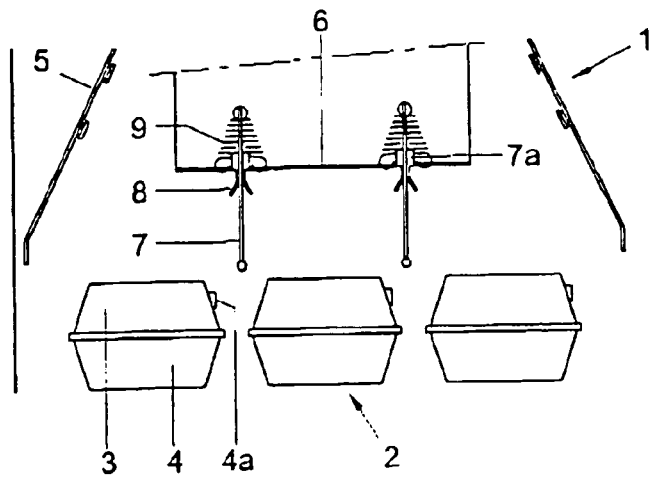

The invention relates to a gripper device according to the preamble of claim 1.

Such a device is known from EP 1285870 of applicant. It is elaborately elucidated in this application that it needs to be possible for different patterns of units to be picked up and that, also, all covers are to remain closed during the pickup. This is achieved with the aid of the combination of at least one horizontal plate and of flaps or intermediate plates. Here, the horizontal plate presses the covers by closed, or keeps them closed when they have been closed. The intermediate plates are vertically suspended in openings or slots of a bottom plate of the gripper head and further downwards between the abovementioned horizontal plates, while these intermediate plates position themselves between the units during the pickup. When the gripper blades press together, the intermediate plates form such a support that the units can be clamped, picked up, transferred and put down again.

It has been found that such a combination works well. However, a problem is formed by the many shapes that the units may have. For instance in the egg business, more in particular with regard to the supplier, such as a chain store business or packing station, there appear to be regular switches to slightly or radically modified egg containers. This is not only done to improve the ease of handling thereof, but frequently to enhance the visibility and the possibility for printing. An answer to such a problem is urgently desired, all the more since very large numbers of units are involved in the current self-service market.

In order to obviate the drawback described, the gripper device according to the present invention is characterized in that the intermediate plates are each pressed in substantially vertical direction with a spring member. In particular, the invention is characterized in that the top end of each intermediate plate is connected with at least one single draw spring which is, on the other end, connected with the housing, for instance with the bottom plate, while, more in particular, the top end of each intermediate plate is pressed by the leaf of a leaf spring, the leaf spring being connected with the housing, for instance with the bottom plate.

It is achieved in a suitable manner that the intermediate plates are not only self-searching, but also, particularly with slightly different shapes of the units, such as for instance egg containers, are hardly hampered by these and will still be positioned between the units by pressing with springs.

In a further embodiment, the device is characterized in that, in a suspended main portion and near the suspended end, the intermediate plates will, with at least one single bend, merge into an engaging edge, with an angle between 0° and 40° between main portion and engaging edge, with the engaging edge, upon engaging, ending at the height of the bottom portion of such a unit, in particular that the intermediate plates have a second bend in the main portion, with a transition portion being formed between the main portion and the engaging edge, with an angle between 0° and −40° for the second bend, with the engaging edge, upon engaging, ending at the height of the bottom portion of such a unit.

It is achieved with advantage that an intermediate plate assumes the shape of a hand even more in order to be able to engage the edges of a unit in a similar manner.

In a further embodiment, one of the sides of the intermediate plate is provided with a material structure with great friction at the location of the downward end thereof.

In a very suitable manner, this friction can thus be used on the engaging side of an engaging edge.

In still another embodiment, the device is characterized in that the intermediate plate ends at the height of the cover portion of such a unit, with the intermediate plate being provided with a bottom edge having the shape of a claw edge with claw members, for instance hooks or teeth, which extend to both sides of the claw edge, for engaging the covers correspondingly placed on both sides.

In this manner, it is very advantageously possible to pick up units mutually connected with a crease connection edge, while the claw edge engages and supports at the same time.

Figure 2:
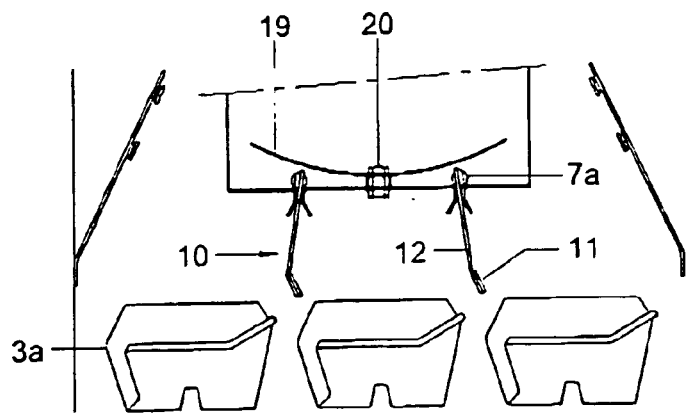
Figure 3:
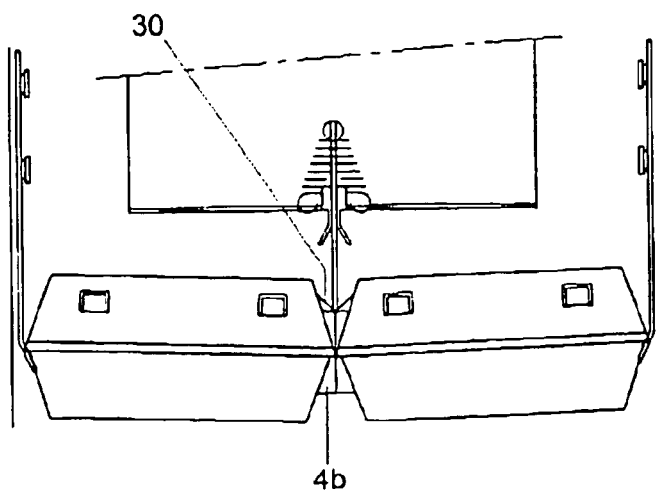

The invention will hereinafter be elucidated in detail, in which:

FIG. 1 diagrammatically shows a view of a first exemplary embodiment,

FIG. 2 diagrammatically shows a view of a second exemplary embodiment,

FIG. 3 diagrammatically shows a view of a third exemplary embodiment.

In the different figures, same parts are numbered the same.

In FIG. 1, gripper device 1 with gripper blades 5 is positioned such that units 2, for instance egg containers with cover 3, bottom portion 4, which are provided with thickenings 4a over which the cover 3, with holes therein in suitable positions, snaps upon closing, can be picked up. During the controlled positioning of the device, in FIG. 1 downwards, intermediate plates 7 lower between the units 2. These intermediate plates 7, two in number to place between three units (and therefore generally n in relation to (n+1)), are suspended in slots 8 of a bottom plate 6 of the housing in which, also, the control members (not shown) for the gripper blades 5 are present. The intermediate plates 7 are supported in the bottom plate 6 by supporting edges 7a, while their top ends are connected with the housing, more in particular the bottom plate 6, with springs 9. These springs are coil springs functioning as draw springs.

Particularly in the case that the units 2 are less symmetrically shaped as shown in FIG. 1, the intermediate plates 7 may encounter edges when moving downwards. In order for the downward end to still reach the height of the bottom portion 4, the intermediate plates will be pushed down or pressed down by the springs 9, after which reliable pickup, transfer and placement of the units is possible again. For the operation of the clamping members (not shown in the Figures), for instance designed as horizontal plate, reference is made to EP 1285870.

FIG. 2 shows units 2 which are, most clearly in the view direction, not symmetrical, with, in particular, a cover bend 3a in the cover 3. Near their downward ends, the intermediate plates 7 are provided with a bend 10, whereby a main portion 11 and an engaging edge 12 are obtained. In addition, in this embodiment, the supporting edges do not have a symmetrical design either, so that, upon moving downwards, the main portion is not strictly vertically suspended anymore, but will incline to one direction or another. The intermediate plate forms, as it were, a hand which, upon pressing between the units, adjusts to the shape of such a unit 2. In this embodiment, the spring member is a leaf spring 19 which is connected with the bottom plate by a clamping screw. With this leaf spring, it is achieved in a suitable manner that simultaneous rotating and pressing of the intermediate plates is obtained, more than in the embodiment according to FIG. 1, because, there, the symmetrically mounted springs will actually pursue the vertical direction.

It has been found that a suitable bend has an angle between 0° and 40°.

A further possibility, which is not shown in a Figure, is that in which, in a position slightly higher than the bend shown, another bend has been provided, but in a different direction, with, in that case, angles between 0° and −40°. In such an embodiment, the natural shape of the hand is even better approximated since something like a wrist joint is also imitated.

In FIG. 3, the units 2 are mutually connected with a crease connection edge 4b. In this embodiment according to the present invention, intermediate plates 7 are used which end higher, but are provided with a claw edge 30 at their ends, for instance teeth or a projection to both sides to be able to thus puncture the covers and to be able to exert a supporting force in pickup, transfer and placement.

The invention claimed is:

1. A gripper device for displacing at least one single unit of consumer packages which units are a package for individual products and are provided with a cover and a bottom portion and two opposite longitudinal sides, the gripper device comprising:

a housing having a bottom plate with slots;

control members that are accommodated in the housing;

gripper members, movable in a rotating and translating manner with the aid of the control members, wherein the gripper members are configured to engage the units on the two opposite longitudinal sides thereof, in order for said units, after being closed to be picked up, transferred and subsequently placed in outer packages in a controlled manner, and to be picked up from the outer package in the same manner;

clamping members, configured to keep the cover closed during pickup, transfer and discharge of the said closed units;

n intermediate plates having a top end and a downward end and two sides, with n≧1, which intermediate plates suspended vertically through the slots in the bottom plate and configured to be placed and clamped between the at least (n+1) units in order to keep these units in their relative positions during pickup, transfer and placement, in cooperation with the gripper members and the clamping members; and at least one spring member that engages a top part of an associated intermediate plate to exert an downwardly directed biasing force on the intermediate plate so that, during transfer, the intermediate plates are each pressed in substantially vertical downward direction by means of the at least one spring member.

2. The device according to claim 1, wherein the at least one spring member is a draw spring having a first and a second end, the first end being connected near the top end of the associated intermediate plate, the second end being connected with the housing.

3. The device according to claim 1, wherein the at least one spring member is a leaf spring that is connected with the housing and that has at least one leaf that engages the at least one intermediate plate adjacent the top end thereof to exert the downwardly directed biasing force.

4. The device according to claim 1, wherein the at least one intermediate plate comprises:

a main portion an engaging edge near a free downward end of the at least one intermediate plate; and a first bend via which the main portion merges into the engaging edge, wherein an angle between the main portion and the engaging edge is included in the range of 0° to 40°, the intermediate plate being configured so that the engaging edge, upon engaging, ends at the height of the bottom portion of a said unit.

5. The device according to claim 4, wherein the at least one intermediate plate comprises:

a transition portion extending between the main portion and the engaging edge; and a second bend via which the main portion merges into the transition portion, wherein an angle between the transition portion and the main portion is included in the range of 0° to −40°, wherein the intermediate plate is configured so that, when a said unit is engaged by an intermediate plate, the engaging edge ends at the height of the bottom portion of the unit and that the engaging edge and the transition portion both are adjacent the unit.

6. The device according to claim 1, wherein one of the sides of the intermediate plate being provided with a material structure with great friction at the location of the downward end thereof.

7. A device according to claim 1, wherein the at least one intermediate plate has the downward end thereof in the form of a claw edge with claw members that extend away from the two sides of the intermediate plate and that are configured to engage the covers of the units placed on both sides of the intermediate plate.

* * * * *